UNITED STATES PATENT OFFICE.

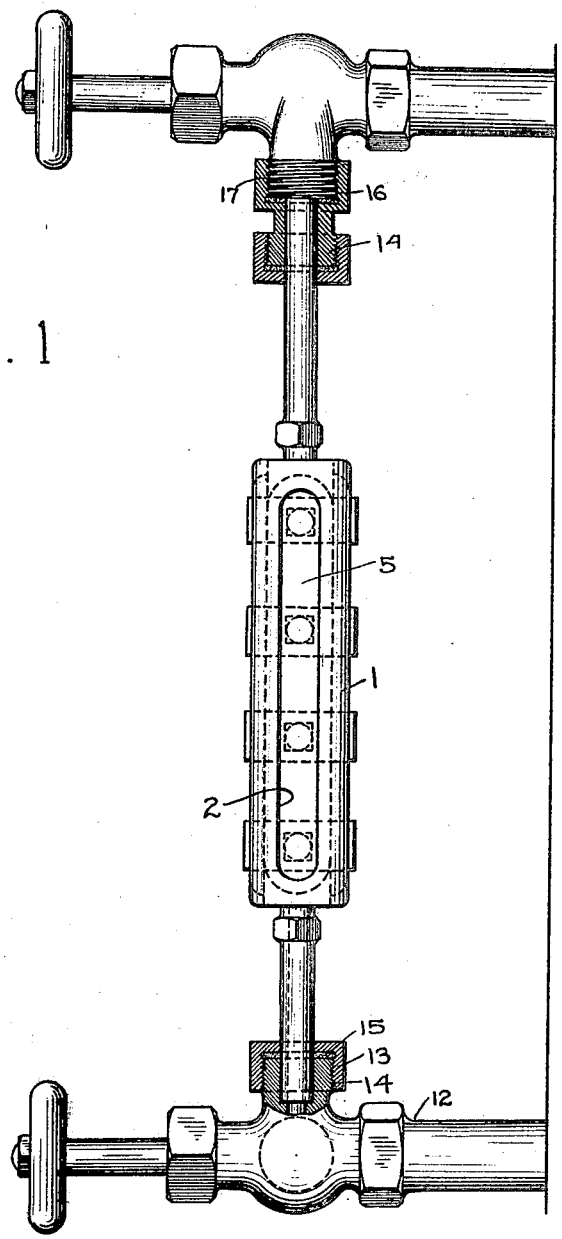

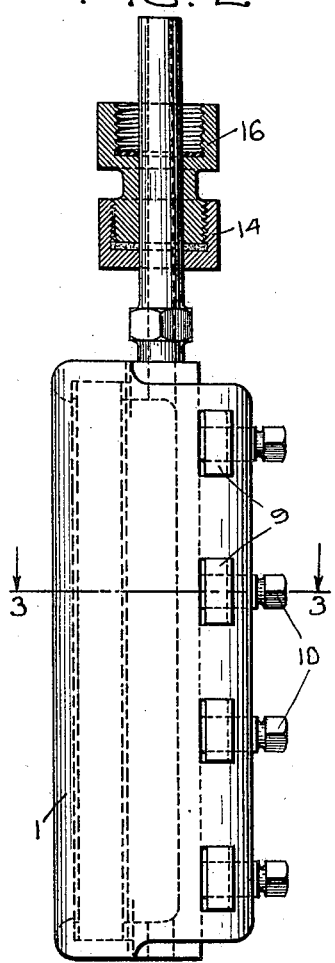
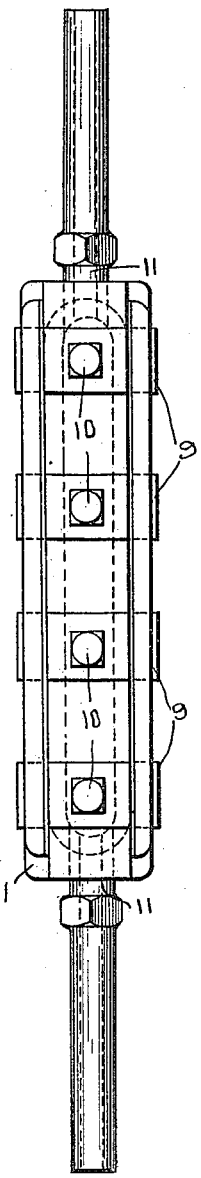
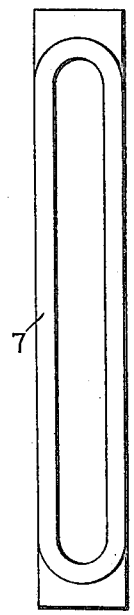
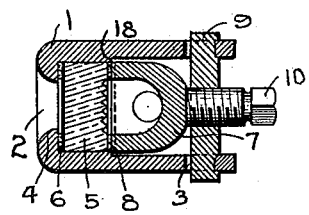

THOMAS L. BERKELEY, OF ALEXANDRIA, VIRGINIA.

WATER-GAUGE-GLASS HOLDER.

1,407,627. Specification of Letters Patent. Patented Feb. 21, 1922.

Application filed April 12, 1920. Serial No. 373,231.

*To all whom it may concern:*

Be it known that I, THOMAS L. BERKELEY, a citizen of the United States, residing at Alexandria, in the county of Alexandria and State of Virginia, have invented new and useful Improvements in Water-Gauge-Glass Holders, of which the following is a specification.

This invention relates to an improved water gauge glass holder and the principal object of the invention is to provide a casing, including the water column and its glass front with means for clamping the parts in said casing.

Another object of the invention is to provide gaskets between the glass front and a part of the holder and between said glass front and the column, said gaskets being firmly held in place by the pressure exerted by the clamping means and the gaskets at the water column being prevented from being blown out by the sides of the casing.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view showing the invention in use, parts being shown in section.

Figure 2 is a side view of the device.

Figure 3 is a section on line 3—3 of Figure 2.

Figure 4 is a rear view of the device.

Figure 5 is a view of the water column.

Figure 6 is an end view of said column.

As shown in these views 1 indicates the casing which has its rear open and its front provided with an opening 2. Slots 3 are formed in each side of the casing adjacent the rear edge thereof, said slots being spaced apart as shown. The opening is so formed as to leave a flange 4 at the front of the casing. A glass plate 5 is arranged in said casing at the front thereof and a gasket 6 is placed between this plate and the flange, the glass plate covering the opening. The water column 7 is placed in said casing with its open front covered by the glass plate and a gasket 8 is placed between said column and the plate. The parts are held under pressure in said casing by means of the clamping blocks or bars 9 engaging the slots 3 and carrying the clamp screws 10 which have their ends engaging the column. The bars are notched to engage the walls of the slots as clearly shown in Figure 3. Nipples 11 are tapped in the ends of the water column and these nipples pass through suitable openings in the ends of the casing. The nipples are connected with the valved supporting members 12 by the cap 13 engaging the screw threaded part 14, suitable packing material 15 being placed between said parts. At one end the part 14 is provided with a screw threaded socket 16 to receive the screw threaded part 17 of the upper supporting member. This arrangement permits the nipples to be cut short enough to apply the device without breaking the joints of the supporting members.

A shoulder 18 is formed at the sides of the casing to receive the edges of the water column and its gasket, this shoulder acting to prevent the gasket from being blown out.

It will thus be seen that the parts are enclosed by the casing and the said parts are firmly clamped in said casing so as to be held therein under pressure. The parts are machined to make close fits.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a casing having its rear open and an opening formed in the front thereof, each side of the casing adjacent the rear edge having spaced slots formed therein, a flange provided on the front of said casing, a glass plate arranged in the front of the casing, a gasket located between said plate and flange, a water column located in the casing, with its open front covered by said plate, a gasket placed between the column and plate, notched clamping blocks engaging the slots formed in the sides of the casing for holding the ports under pressure, nipples tapped in the ends of said column and passing through the openings formed in the ends of the casing, valved supporting members connected with said nipples and means for forming the said connection.

In testimony whereof I affix my signature.

THOMAS L. BERKELEY.